United States Patent
Vernick (10) Patent No.: US 7,995,731 B2
(45) Date of Patent: Aug. 9, 2011

(54) TAG INTERROGATOR AND MICROPHONE ARRAY FOR IDENTIFYING A PERSON SPEAKING IN A ROOM

(75) Inventor: Michael Vernick, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1120 days.

(21) Appl. No.: 11/590,839

(22) Filed: Nov. 1, 2006

(65) Prior Publication Data

US 2008/0101576 A1     May 1, 2008

(51) Int. Cl.
*H04M 3/42* (2006.01)
*G08B 1/08* (2006.01)

(52) U.S. Cl. .............. 379/202.01; 340/539.13
(58) Field of Classification Search ............. 340/572.1, 340/539.13; 381/92; 379/202.01
See application file for complete search history.

(56) References Cited

U.S. PATENT DOCUMENTS

| | | | |
|---|---|---|---|
| 6,959,074 B2 | 10/2005 | Berstis | |
| 7,403,120 B2 * | 7/2008 | Duron et al. | 340/572.1 |
| 2005/0135583 A1 | 6/2005 | Kardos | |
| 2006/0088173 A1 * | 4/2006 | Rodman et al. | 381/92 |

FOREIGN PATENT DOCUMENTS

JP     2005080110 A   *   3/2005

OTHER PUBLICATIONS

Carlos Busso et al., "Smart Room: Participant and Speaker Localization and Identification," University of Southern California, http://www.ict.usc.edu/publications/busso-smartroom-icassp.pdf.
Anonymous, "Meeting Room, an Interactive Systems Labs. Project, What, When, Where, Who, to Whom?", http://penance.is.cs.cmu.edu/meeting_room/people_id/.

* cited by examiner

*Primary Examiner* — Ahmad F Matar
*Assistant Examiner* — Sonia Gay
(74) *Attorney, Agent, or Firm* — Muncy, Geissler, Olds & Lowe, PLLC (57) ABSTRACT

A conferencing room has conferencing equipment which identifies a person speaking, among a group of people in the conferencing room, to remote participants in a conference call. The conferencing equipment includes a plurality of unique tags, each fixed proximate to a seating position for a person in the conferencing room. Each person reads the tag at their seated position using a personal interrogator, which may be incorporated into a cellular telephone. The person's identification and seated location are received and stored by a controller. The controller receives inputs from a microphone array, which monitors the voices in the room. By using the microphone array, the controller can approximate the source of the voice to one of the unique tag locations and hence can identify the person speaking.

20 Claims, 7 Drawing Sheets

TAG INTERROGATOR AND MICROPHONE ARRAY FOR IDENTIFYING A PERSON SPEAKING IN A ROOM

BACKGROUND OF THE INVENTION

1. Field of the Invention

The present invention relates to conference call systems. More particularly, the present invention relates to a system for identifying a person speaking on a conference call to the other, remotely located conference call participants.

2. Description of the Related Art

Conference calls are common practice in many businesses. Frequently many people will gather in a conferencing room and a speakerphone will be used to link the conferencing room to a conference call. When one of the persons in the conferencing room speaks on the conference call, the remotely located participants of the conference call (outside of the conferencing room) often times do not know the identity of the speaker.

It is not productive to interrupt the conference call to ask the identity of the speaker. It is also not productive for each person to state their name prior to speaking on the conference call. Both instances take up conference call meeting time. Therefore, there has existed a need in the art to automatically identify a person speaking on a conference call to the other remotely located participants in the conference call. The solution has proved to be especially difficult and costly when the person speaking is in a room of people and communicating over conference call equipment shared by all of the people in the room, rather than interacting one-on-one with personal telephone conferencing equipment.

One solution to the problem can be found in an undated article entitled "Smart room: participant and speaker localization and identification," by Carlos Busso et al. of University of S. California, found at: http://www.ict.usc.edu/publications/busso-smartroom-icassp.pdf, which is hereby incorporated by reference.

In the article, Busso et al. describe a system employing four cameras in the four corners of the conferencing room, a full-circle 360 degree camera located at the center of the table, and an array of 16 microphones. The three monitoring systems are integrated with the microphone array being used to localize the sound source and for voice analysis identification and the cameras being used for position tracking and facial identification. The software and hardware requirements of the Busso et al. system are rather complex and costly.

Another solution to the problem can be found in an anonymous, undated article entitled "Meeting Room, an Interactive Systems Labs. Project, What, When, Where, Who, to Whom?" found at: http://penance.is.cs.cmu.edu/meeting_room/people_id/, which is hereby incorporated by reference. Like the Busso et al. system, cameras are employed and face identification is used to identify the person speaking. Again, the software and hardware are relatively expensive and computational requirements are robust to operate the system at a level to provide reliable identification of the speaker.

US published application 2005/0135583, incorporated by reference herein, discloses a system for identifying participants speaking on a conference call to other participants. When more than one participant is present in a room and using a common speakerphone, the system uses voice pattern recognition or a person presses a button while speaking to make his identity known to the other conference call participants. Pressing a button is an extra manual step and an inconvenience to the user. Voice recognition, while automatic, is computationally complex and looses accuracy as the pool of potential conference call participants grows in a large company or university setting. Further a voice analysis system requires all potential conference call participants to register a voice pattern with the system, such as by reading a prescribed text passage which is time consuming, and the system would also require memory storage space for the many voice patterns.

U.S. Pat. No. 6,959,074, incorporated by reference herein, also discloses a system for identifying participants speaking on a conference call to other participants. Like published application 2005/0135583, U.S. Pat. No. 6,959,074 utilizes voice recognition to identify the speaker.

SUMMARY OF THE INVENTION

It is an object of the present invention to address one or more of the drawbacks associated with the background art.

It is a further object of the present invention to provide a system for identifying a person speaking in a room of people which is relatively less expensive than the background art solutions.

It is a still further object of the present invention to provide a system for identifying a person speaking in a room of people which is relatively more reliable than the background art solutions.

These and other objects are accomplished by a conferencing room having conferencing equipment which identifies a person speaking, among a group of people in the conferencing room, to remote participants in a conference call. The conferencing equipment includes a plurality of unique tags, each fixed proximate to a seating position for a person in the conferencing room. Each person reads the tag at their seated position using a personal interrogator, which may be incorporated into a cellular telephone. The person's identification and seated location are received and stored by a controller. The controller receives inputs from a microphone array, which monitors the voices in the room. By using the microphone array, the controller can approximate the source of the voice to one of the unique tag locations and hence can identify the person speaking.

These and other objects may also be accomplished by a conferencing room having conferencing equipment which identifies a person speaking, among a group of people in the conferencing room, to remote participants in a conference call. The conferencing equipment includes a plurality of interrogators, each fixed proximate to a seating position for a person in the conferencing room. Each person presents a tag at their seated position to the local interrogator, where the tag may be part of the person's employee identification card. The person's identification and seated location are received and stored by a controller. The controller receives inputs from a microphone array, which monitors the voices in the room. By using the microphone array, the controller can approximate the source of the voice to one of the interrogator locations and hence can identify the person speaking.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF A PREFERRED EMBODIMENT

Figure 1:
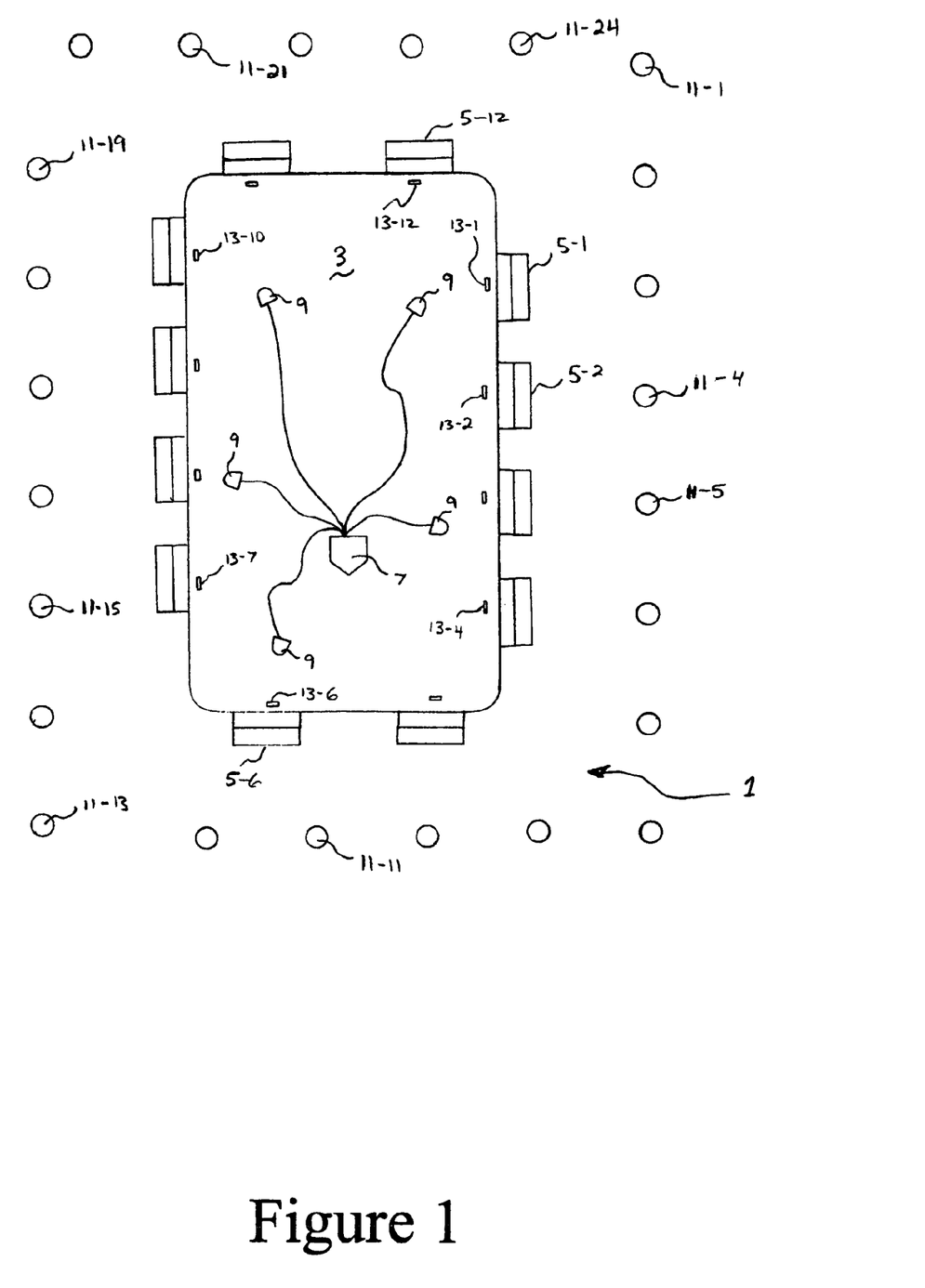
FIG. 1 is an overhead view of a conferencing room, in accordance with the present invention.

FIG. 1 is an overhead view of a conferencing room 1, in accordance with the present invention. The conferencing room 1 includes a conference table 3 and a plurality of chairs 5-1 through 5-12 surrounding the conference table 3. A conventional speakerphone 7 is placed on the conference table 3.

The conventional speakerphone 7 includes one or more speakers, a keypad and conventional control keys (e.g. volume up/down, end, flash, mute, hold, transfer, memory dial). The conventional speakerphone 7 also includes one or more built in microphones and/or may also include one or more jacks to receive auxiliary microphones 9, as illustrated.

Now, the aspects of the present invention illustrated in FIG. 1 will be described. Spaced around the conferencing room 1, in fixed locations, are microphones 11-1 through 11-24 of a microphone array. In a preferred embodiment, the microphones 11-1 through 11-24 are attached to, or mounted partially or wholly within, the walls and/or ceiling of the conferencing room 1. The microphones 11-1 through 11-24 are each fixed in a set location and are each connected to a controller 27 by a hardwired or wireless link, as will be further explained below. Although twenty four microphones 11 are illustrated more or less microphones 11 may be employed, such as eight, ten or twelve.

As illustrated in FIG. 1, tags 13-1 through 13-12 are fixed proximate to respective potential seating positions within the conferencing room 1. For example, tag 13-1 is placed at a fixed position proximate chair 5-1, tag 13-2 is fixed in a position proximate chair 5-2, and so forth. Although twelve tags 13-1 through 13-12 are illustrated more or less tags may be employed, where the number of tags 13 is equal to the number of potential seating positions in the conferencing room 1. Also, although tags 13 are illustrated as being attached to a topside of the conference table 3, the tags 13 could be attached to the underside of the conference table 3 or to the floor under a respective chair 5, or directly to chairs 5, where the chairs 5 are in turn fixed in position adjacent to the conference table 3.

Figure 2:
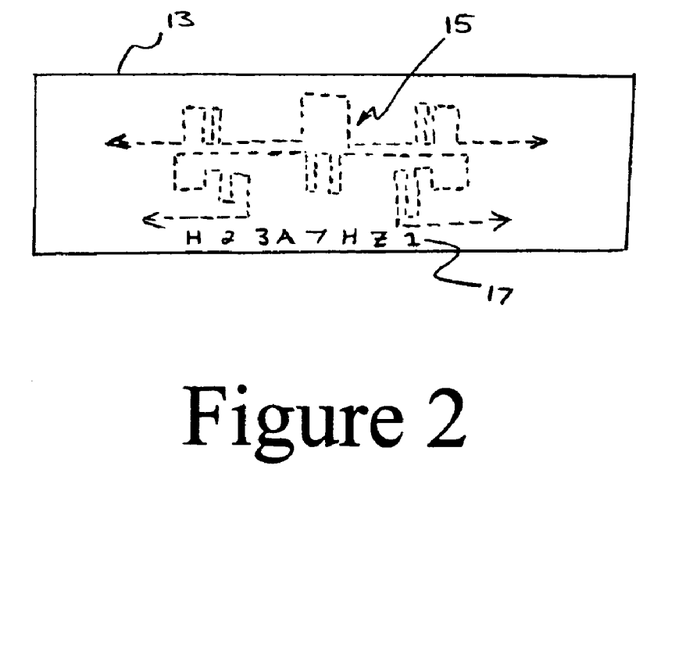
FIG. 2 illustrates a tag, in accordance with a first embodiment of the present invention.

FIG. 2 illustrates a first embodiment of a tag 13. Each tag 13 may be formed on an adhesive label and include an embedded RFID circuit 15. The RFID circuit 15 emits a code uniquely associated with the tag 13, when interrogated by an RFID interrogator, in a known manner. The tag 13 may also include a unique printed code 17 on a front surface thereof for inventory/identification purposes. In accordance with the present invention, each of the tags 13-1 through 13-12 emits its own unique RFID code when interrogated.

Figure 3:
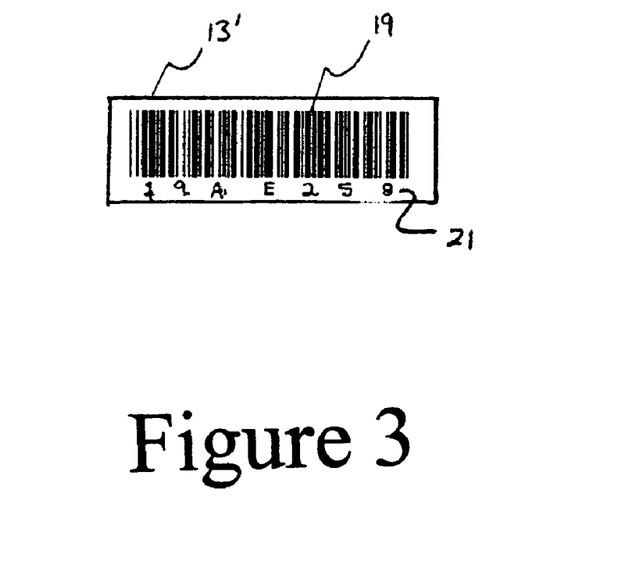
FIG. 3 illustrates is a tag, in accordance with a second embodiment of the present invention.

FIG. 3 illustrates a second embodiment of a tag 13'. Each tag 13' may be formed on an adhesive label and include a bar code 19 printed on the front surface thereof. The bar code 19 represents a unique code which may be read by a bar code interrogator or scanner, in a known manner. The tag 13' may also include a unique printed code 21 on the front surface thereof for inventory/identification purposes. In accordance with the present invention, each of the tags 13-1' through 13-12' would have its own unique bar code printed thereon.

Figure 4:
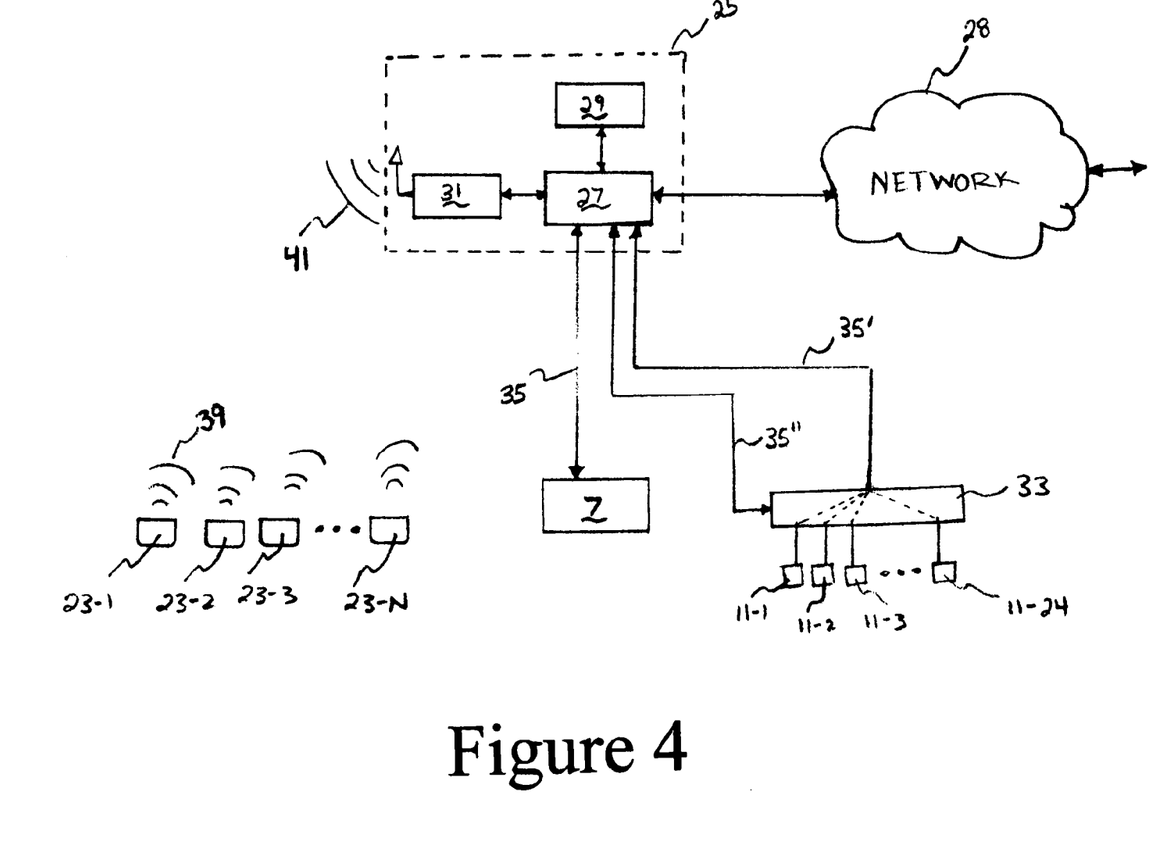
FIG. 4 is a block diagram illustrating one embodiment of the functional units of FIG. 1.

FIG. 4 is a block diagram illustrating one embodiment of the functional units operating in conjunction with the conferencing room 1 of FIG. 1. A conference call supplemental data unit 25 includes the controller 27 connected to a memory 29 and a receiver or transceiver 31. The unit 25 may be located in a physically separate location from the conferencing room 1, such as in a network closet or equipment room where the telephone lines are connected to a patch panel.

The telephone line from the speakerphone 7 of the conferencing room 1 is connected to a first input/output port of the controller 27. A second input/output port of the controller 27 is connected to a network 28, such as a publicly switch telephone network (PSTN) or a private network of the business. In a first mode of operation, the controller 27 functions solely as a "pass through" and permits the speakerphone 7 to function as normal, i.e. as through the speakerphone 7 were connected to the network 28 directly through a connector of the patch panel. This first mode of operation would correspond to the unit being turned off, i.e. a person speaking in conferencing room 1 would not be identified to conference call participants.

The controller 27 is hardwired to the microphones 11-1 through 11-24 of the microphone array. The microphones 11-1 through 11-24 may be hardwired directly to the controller 27, but more preferably are hardwired to the controller 27 via a multiplexer 33, so as to reduce the number of wires connecting the microphones 11-1 through 11-24 to the controller 27. For example, a first un-used pair 35' of a twisted pair cable 35 connecting the controller 27 to the speakerphone 7 may be used to transmit sound samples from the microphones 11-1 through 11-24 of the microphone array to the controller 27, and a second un-used pair 35" of the twisted pair cable 35 connecting the controller 27 to the speakerphone 7 may be used as a control line so that the controller 27 can cause the multiplexer 33 to switch between desired microphones in a desired pattern and at a desired frequency.

As mentioned above, the memory 29 and the receiver (or transceiver) 31 are also connected to the controller 27. The memory 29 stores an operation program for the controller 27 and also stores identification codes and location codes, as will be further explained below. The receiver 31 receives identification codes and location codes from interrogators 23-1 through 23-N. Alternatively, the receiver 31 may be a transceiver 31 such that after receiving identification codes and location codes, the transceiver 31 may send a confirmation signal so as to acknowledge to the interrogators 23-1 through 23-N that the codes have been received correctly.

Although FIG. 4 illustrates the controller 27, memory 29 and receiver/transceiver 31 as being housing in a common unit 25, theses elements may be housed in one or more separate units. Although the description states that the unit 25 is located in the network closet, the unit 25 may be placed in any convenient location, such as in the conferencing room 1.

Figure 5:
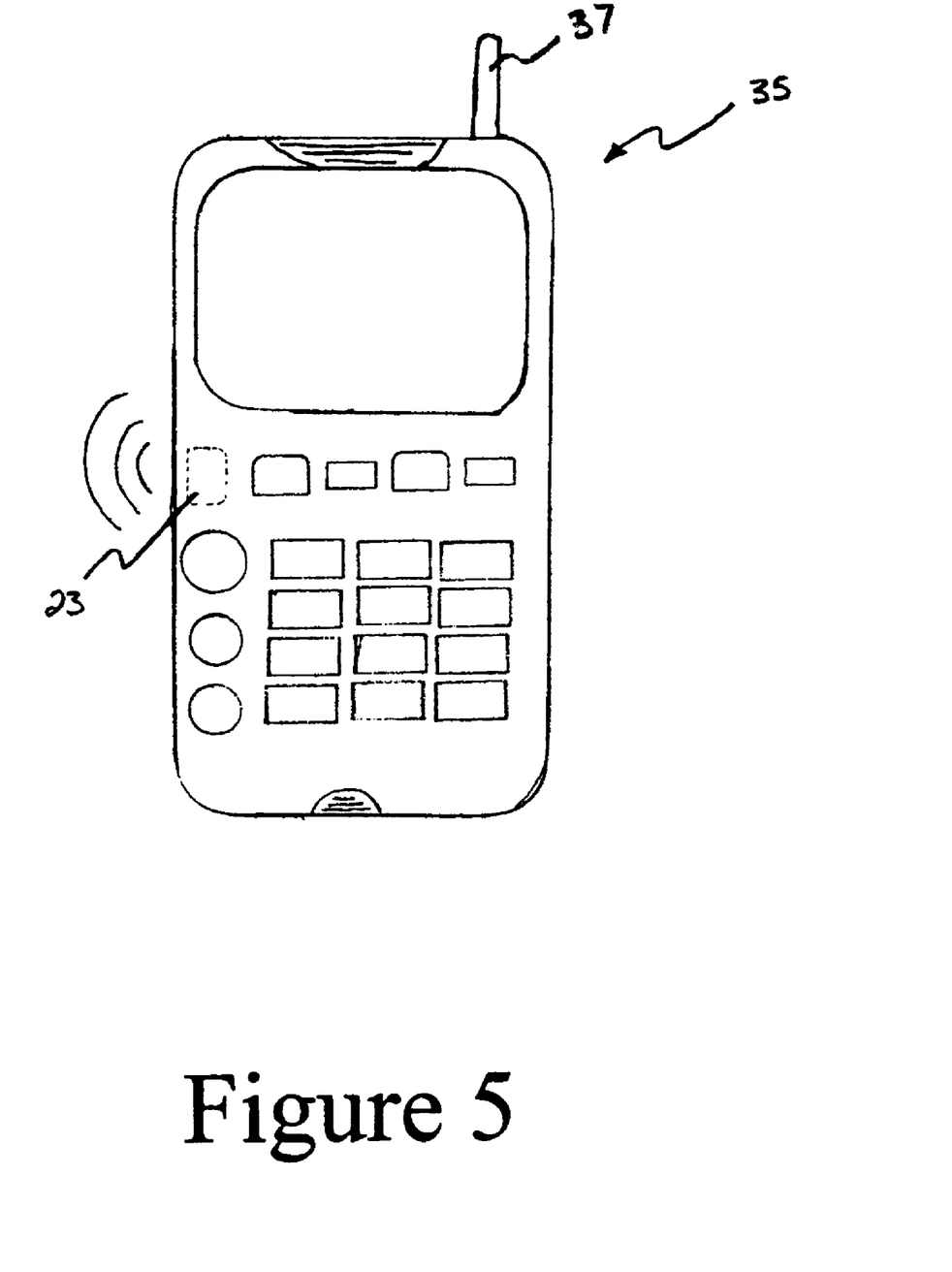
FIG. 5 illustrates an interrogator of the present invention incorporated into a cellular telephone.

FIG. 5 illustrates an interrogator 23 in accordance with one embodiment of the present invention. The interrogator 23 may take the form of an RFID interrogator, if the tags 13 are in the form of the RFID code of FIG. 2. Alternatively, the interrogator 23 may take the form of a bar code interrogator or scanner, if the tags 13' are in the form of the bar codes of FIG. 3. As illustrated in FIG. 5, the interrogator 23 is preferably embodied within a self-powered device commonly carried by a user, such as a cellular telephone 35. The interrogator 23 may draw power directly from the battery of the cellular telephone 35. Also, the interrogated/read code may be sent to the receiver/transceiver 31 of the unit 25 using the transmission system and antenna 37 of the cellular telephone 35. Although a cellular telephone 35 has been illustrated as embodying the interrogator 23, other devices may be used, such as a personal digital assistance (PDA), a laptop computer, or a special dedicated device provided to employees solely for reading tags 13.

Now with reference to FIGS. 1-5, an operation of the present invention will be described in detail. A conference call participant or user enters the conferencing room 1. The user selects a desired seating position, such as seat 5-1. Once seated, the user causes their personal interrogator 23-5 to read the tag 13-1 located proximate to their seated position 5-1. This may be accomplished by pressing a button or by a menu selection on the interrogator's host device (e.g. cellular telephone 35).

The interrogator 23-5 has a unique identification code (e.g. ID235) stored therein which is linked to the identity of the possessor (i.e. the user) of the interrogator 23. The interrogator 23-5 transmits this unique identification code ID235 along with the location code (e.g. LC131) read from the tag 13-1. The transmission 39 is received by the receiver/transceiver 31 of the unit 25. Preferably, the transmission 39 is acknowledged by a confirmation transmission 41 from the transceiver 31 to the interrogator 23-5, such that the interrogator 23-5 beeps to alert the user that an accurate data format was received at the unit 25.

The controller 27 takes the identification code ID235 and looks it up in the memory 29. The memory 29 has information stored therein corresponding to the interrogators 23 assigned to employees, students or potential (e.g. registered) users of the conferencing room 1. Such information would include a listing of the unique identification codes for each potential user associated with the user's name and possibly additional information, such as employer, job title (e.g. marketing director, CEO, engineer), job description (e.g. Asian market direct sales support and training of sales staff, biographical data (e.g. BSEE Virginia TECH 1985, MBA George Mason University 1988, employee since 1995), business address, email address and/or telephone number. Alternatively, the identification code could include all of the needed information and such information need not be stored in the memory 29.

The controller 27 takes the location code LC131 and stores it in memory 29 in association with the identification code ID235 transmitted along with the location code LC131. In other words, the controller 27 temporarily links the location code LC131 and the identification code ID235. This process is repeated for all of the participants in the conference call seated in the conferencing room 1.

During the conference call, whenever a person in the conferencing room 1 is speaking, the controller 27 monitors the microphones 11-1 through 11-24 of the microphone array to approximate the location of the person speaking to one of the possible seating positions in the conferencing room 1. The output of the microphone array is analyzed (such as by comparing intensity levels of the microphones and/or echoes) to determined the most likely seating position of the speaker. The location code of the most likely seating position is used to access the memory 29 and find the associated identification code, which was linked to that location code when the participant entered the conferencing room 1.

At this point the personal data (e.g. name, title) of the person speaking is known to the controller 27. Next, the controller 27 causes this personal data to be sent to the other participants of the conference call. The personal data can be sent as supplemental data in a known manner and may be displayed on displays of the speakerphones, cellular phones, laptop computers, etc. of the other participants of the conference call in a known manner. Such manners of transmitting and displaying the supplemental data are described in the background art, such as US published application 2005/0135583, which have been incorporated by reference.

To assist the controller 27 in determining the most likely seating position of a person speaking, the system may be initially calibrated by the computer staff or installers of the unit 25. After the unit 25 and the microphones 11-1 through 11-24 are installed, a person sits in one of the seating position (e.g. seat 13-7) and reads aloud. The installer inputs a setup code indicating that the person speaking is at location code LC137. The controller 27 analyzes the outputs of the various microphones 11-1 through 11-24 and stores a mapping of the various ratios of intensity levels between the microphones (the ratio of intensity between microphone 11-15 versus 11-2, 11-15 versus 11-5, 11-3 versus 11-18, etc.). Echo effects may also be sampled and stored. The installer would move to each potential seating position and again calibrate the controller 27 as to the microphone outputs at each seating position. During use, the controller 27 could use the previously stored calibration data to best approximate the location of the person speaking in the conferencing room 1.

Figure 6:
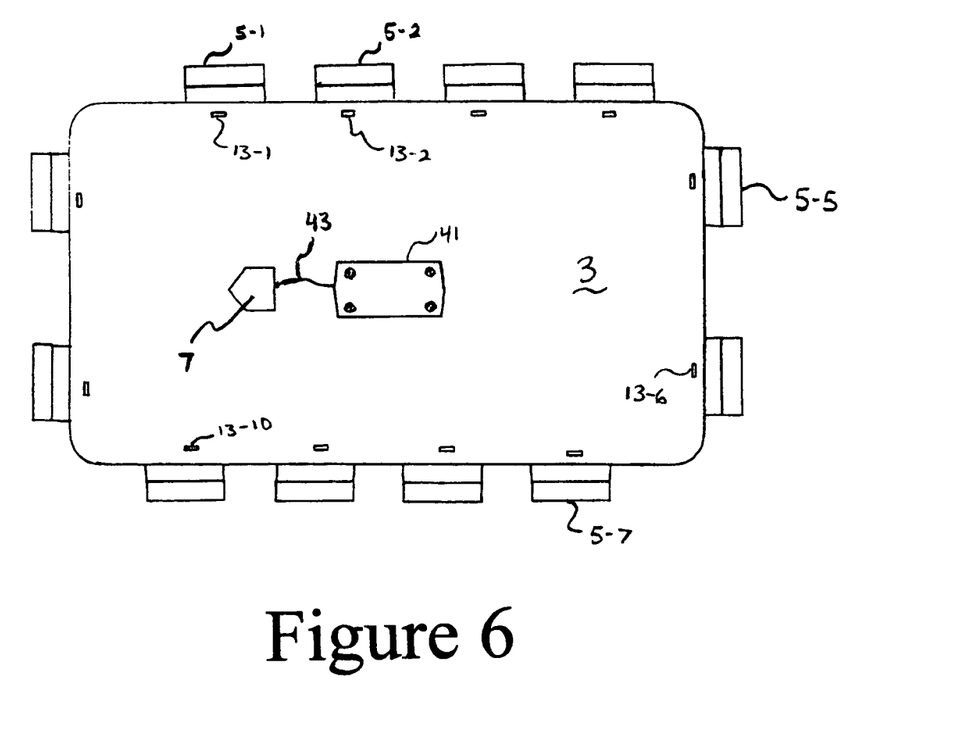
FIG. 6 is an overhead view similar to FIG. 1, but illustrating an alternative microphone array console embodiment.

FIG. 6 illustrates a first alternative embodiment to the conferencing room configuration of FIG. 1. In FIG. 6, the microphone array mounted in/to the walls and/or ceiling has been replaced with a microphone array fixed to the top of the conference table 3. Preferably, the microphone array is housed in an array box 41 which is preferably decorated and may include a sculpture, flower arrangement or display pictures or slogans on its sides and top surface. The array box 41 is connected to the speakerphone 7 by a patch cable 43. The patch cable 43' would include portions of the connections 35' and 35" of FIG. 4.

Figure 7:
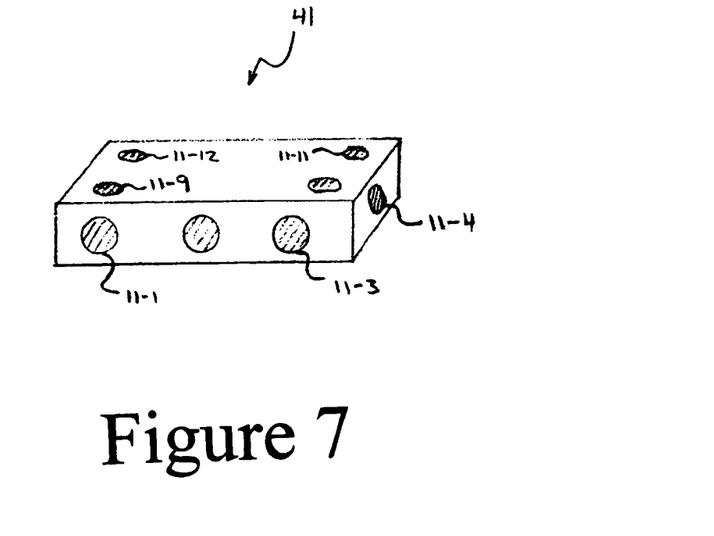
FIG. 7 is a close-up view of the microphone array console.

FIG. 7 is a close-up view of the array box 41. As can been seen, the sides and top of the array box 41 include the plurality of microphones 11-1 through 11-12. Although twelve microphones are illustrated, more or less microphones may be included in the array box 41. For example, all twenty four microphones 11-1 through 11-24 could be included in the array box 41.

The calibration and functioning of the alternative embodiment of FIGS. 6 and 7 would be the same of described in connection with FIGS. 1-5 above. The physical installation of the alternative embodiment of FIGS. 6 and 7 would be somewhat simpler and less expensive in that the microphones would not need to be mounted and wired from remote wall and ceiling locations, with a downside being that the closer spacing of the microphones could degrade the ability of the controller 27 to accurately approximate the location of a person speaking. One or more of the microphones of the array box 41 may serve the dual purpose of receiving voices for the conference call conversation, i.e. the jacks of the speakerphone 7 for receiving external microphones 9 may be connected to one or more of the microphones of the array box 41 hence eliminating the need for auxiliary microphones 9.

This dual use of the microphones could also occur with the embodiment of FIGS. 1-5. In other words, one or more of the microphones 11-1 through 11-24 mounted in or to the walls or ceiling may be hardwired to, or wirelessly connected to, the auxiliary microphone input jacks of the speakerphone 7. Under such circumstance, the auxiliary microphones 9, illustrated as lying about on the top of conference table 3, may be eliminated. This solution makes more space available on the top of the conference table 3 and makes for a more neat appearance in the conferencing room 1. Also, the array box 41 may be used in combination with one or more wall and/or ceiling mounted microphones to improve the resolution ability of the controller 27 in determining the location of the person speaking in the conferencing room 1.

Figure 8:
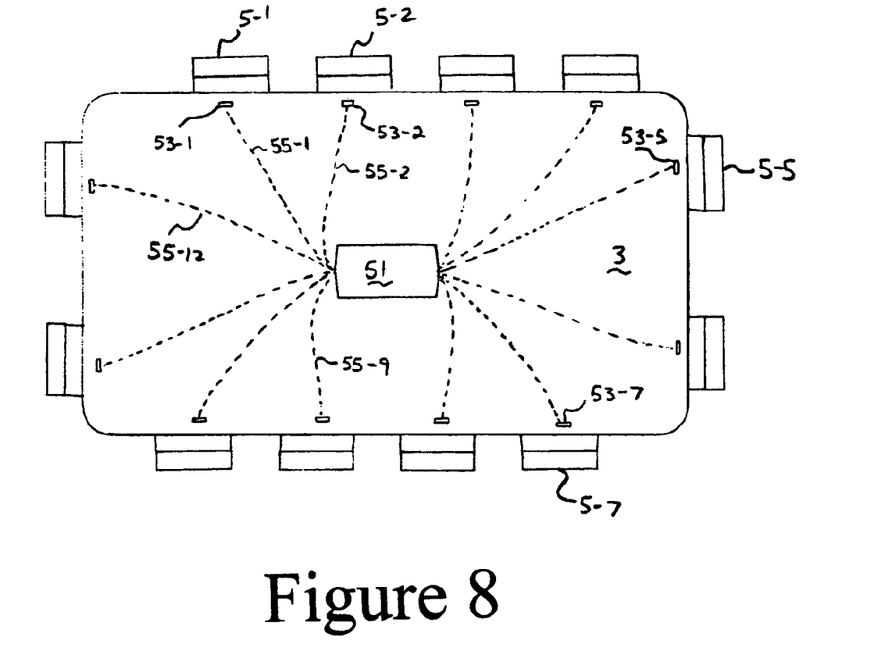
FIG. 8 is an overhead view similar to FIG. 6, but illustrating an alternative interrogator/tag arrangement.

FIG. 8 illustrates a second alternative embodiment to the conferencing room configuration of FIG. 1. There are several differences illustrated in FIG. 8, which may be individually made to the system. A first difference is that the functions of the speakerphone 7 and the array box 41 (of FIGS. 6 and 7) have been incorporated into a single conference call unit 51. This eliminates the need for the patch cord 43 and makes for a more integrated solution which takes up less surface area on the conference table 3.

Another difference is that the tags 13-1 through 13-12 (of FIG. 1) have been removed. In their place have been placed fixed interrogators 53-1 through 53-12. The fixed interrogators 53-1 through 53-12 are hardwired to the conference call unit 51 by wires 55-1 through 55-12 which are located under the conference table 3.

Figure 10:
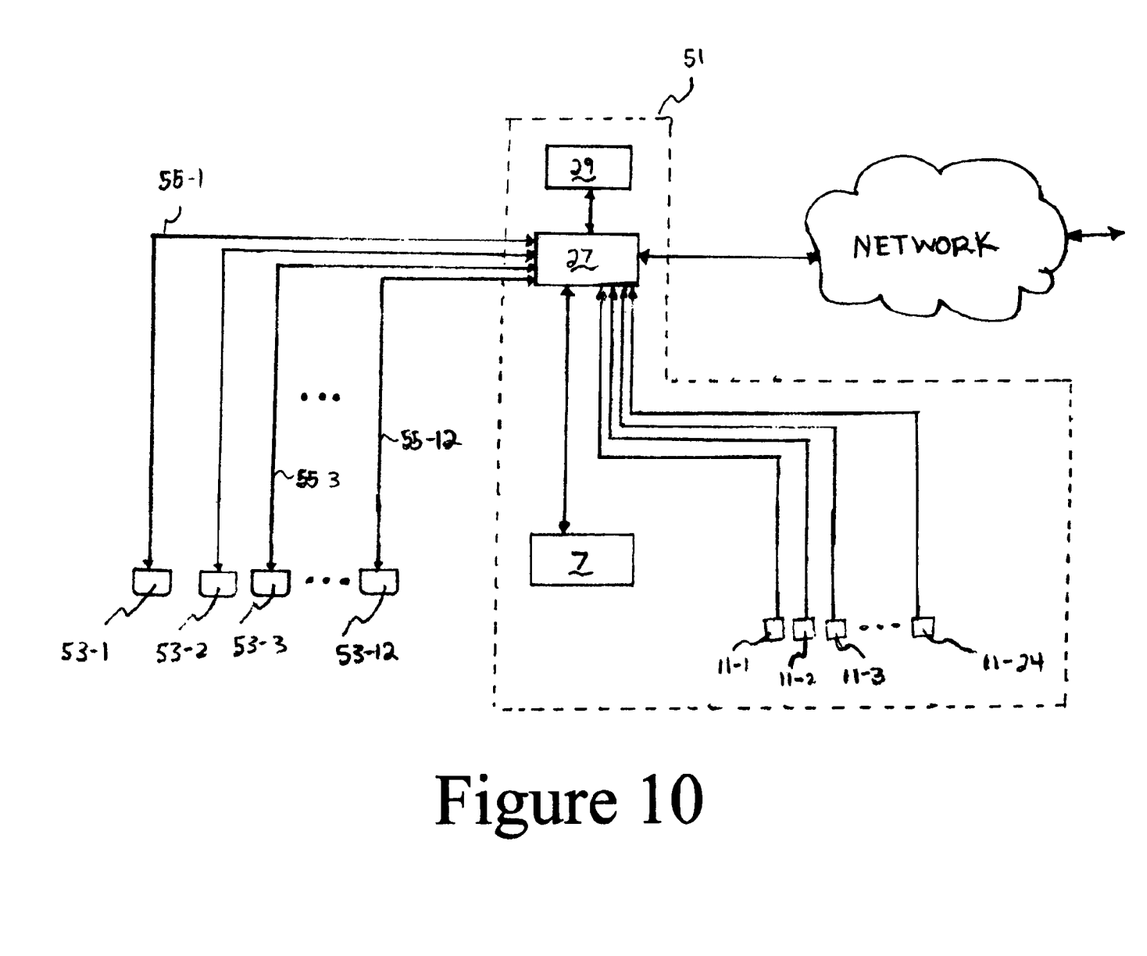
FIG. 10 is a block diagram illustrating one embodiment of the functional units of FIG. 8.

FIG. 10 is a block diagram illustrating the connections of the second embodiment of FIG. 8. As can be seen in FIG. 10, the functions of the speakerphone 7 are now incorporated into the conference call unit 51. Also, the microphones 11-1 through 11-24 are incorporated into the conference call unit 51. The interrogators 53-1 through 53-12 are hardwired to the controller 27, although this may be a wireless connection, if desired.

Now with reference to FIGS. 8-10, a method of operation will be described. A conference call participant or user enters the conferencing room 1. The user selects a desired seating position, such as seat 5-1. Once seated, the user presents a user ID 61 to the proximate interrogator 53-1, which interrogates the user's ID 61. The interrogation may be started by pressing a button on the interrogator 53-1 or by a proximity sensor on the interrogator 53-1, e.g. a sensor which senses a light change.

Figure 9:
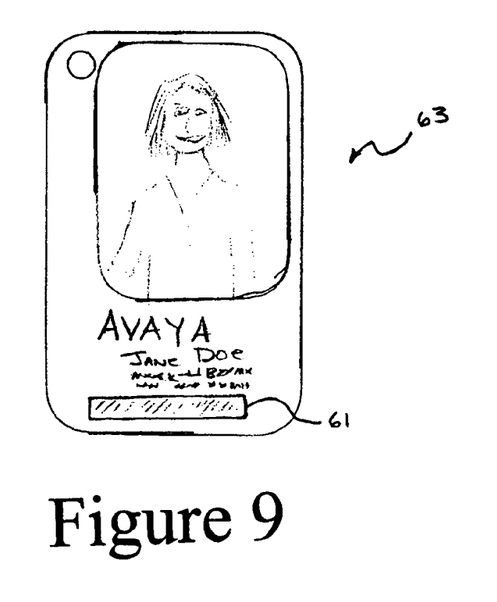
FIG. 9 illustrates a tag incorporated into an ID card.

As illustrated in FIG. 9, the user's ID 61 may be in the form of a bar code or an RFID code printed on or residing within, an employee ID card 63. Alternatively, the user's ID 61 may be a key fob, dedicated conference ID card, or other type of combination use card.

The interrogator 53-1 reads the identity code e.g. (ICRayTate) from the user's ID 61. The interrogator 53-1 has a location identification code (e.g. LC531) stored therein which represents the location of the seating position. The interrogator 53-1 transmits this unique identification code IDRayTate along with the location code LC531 to conference call unit 51.

The controller 27 takes the identification code IDRayTate and looks it up in the memory 29. The memory 29 has information stored therein corresponding to the identification codes assigned to employees, students or potential (e.g. registered) users of the conferencing room 1. Such information would include a listing of the unique identification codes for each potential user associated with the user's name and possibly additional information, such as employer, job title (e.g. marketing director, CEO, engineer), job description (e.g. Asian market direct sales support and training of sales staff), biographical data (e.g. BSEE Virginia TECH 1985, MBA George Mason University 1988, employee since 1995), business address, email address and/or telephone number. Alternatively, the identification code IDRayTate could include all of the needed information and such information need not be stored in the memory 29.

The controller 27 takes the location code LC531 and stores it in memory 29 in association with the identification code IDRayTate transmitted along with the location code LC531. In other words, the controller 27 temporarily links the location code LC531 and the identification code IDRayTate. This process is repeated for all of the participants in the conference call seated in the conferencing room 1.

During the conference call, whenever a person in the conferencing room 1 is speaking, the controller 27 monitors the microphone array to approximate the location of the person speaking to one of the possible seating positions in the conferencing room 1. The output of the microphone array is analyzed (such as by comparing intensity levels of the microphones and/or echoes) to determined the most likely seating position of the speaker. The location code of the most likely seating position is used to access the memory 29 and find the associated identification code, which was linked to that location code when the participant entered the conferencing room 1.

At this point the personal data (e.g. name, title) of the person speaking is known to the controller 27. Next, the controller 27 causes this personal data to be sent to the other participants of the conference call in the manner as discussed above.

Although FIG. 10 illustrates the microphones 11-1 through 11-24 as being located within the conference call unit 51, the microphones 11 may more preferably be reduced in number to twelve and located within the fixed location interrogators 53-1 through 53-12. The additional spacing between the microphones 11 should improve the accuracy of the controller 27 in approximating the location of the person speaking. Also, the microphones 11-1 through 11-12 may be used as the auxiliary microphones which pickup the voice to be heard on the conference call.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. Conference call equipment comprising:
    a controller including:
        an input to receive identification information about a person speaking on a conference call and location information about a fixed seating position within a conferencing room of the person speaking on the conference call, and
        an output to transmit identification information about the person speaking on the conference call to other conference call participants;
    a microphone array including a plurality of microphones located in fixed positions relative to the conferencing room, wherein said microphone array is connected to said controller, and wherein said controller uses sound intensities from said microphone array to determine the fixed seating position of the person speaking on the conference call; and
    an interrogator, wherein said interrogator is incorporated into a cellular telephone carried by the person speaking on the conference call, and wherein said interrogator transmits said identification information and said location information to said input of said controller.

2. The conference call equipment of claim 1, wherein said interrogator is an RFID interrogator for reading an RFID tag mounted in a fixed position proximate a seating position in the conferencing room.

3. The conference call equipment of claim 1, wherein said interrogator is a bar code scanner for reading a bar code tag mounted in a fixed position proximate a seating position in the conferencing room.

4. The conference call equipment of claim 1, wherein at least one microphone of said microphone array is used to transmit the voices of participants to the conference call.

5. The conference call equipment of claim 1, wherein said microphone array includes a plurality of microphones mounted in or attached to the walls or ceiling of the conferencing room.

6. The conference call equipment of claim 1, wherein said microphone array includes a plurality of microphones mounted in or attached to a unit placed in the conferencing room.

7. The conference call equipment of claim 6, wherein said unit is a decorative housing for placement on a conference table in the conferencing room.

8. Conference call equipment comprising:
a controller including:
an input to receive identification information about a person speaking on a conference call and location information about a fixed seating position within a conferencing room of the person speaking on the conference call, and
an output to transmit identification information about the person speaking on the conference call to other conference call participants;
a microphone array including a plurality of microphones located in fixed positions relative to the conferencing room, wherein said microphone array is connected to said controller, and wherein said controller uses sound intensities from said microphone array to determine the fixed seating position of the person speaking on the conference call; and
an interrogator for transmitting said identification information and said location information to said input of said controller, wherein said interrogator is a user carried device which has a unique ID relating to said identification information and which is capable of reading said location information.

9. A method of operating conference call equipment comprising:
receiving an identification code about each person speaking on a conference call and a location code about a respective fixed seating position within a conferencing room of each person speaking on the conference call from a plurality of transmitting devices;
associating the identification code to the location code for each transmitting device;
monitoring the outputs of a plurality of microphones;
selecting a location code closest to a person speaking based upon the outputs of the plurality of microphones; and
sending a signal to other conference call equipment relating to the identification code associated with the selected location code, wherein the location code is embodied on a tag fixed in a location proximate a seating positioning in a conferencing room and read by a device carried by a participant of the conference call, the device carried by the participant having the identification code stored therein and including one of the plurality of transmitting devices.

10. The method of claim 9, wherein the identification code is linked to a person's name and the signal being sent to other conference call equipment represents the person's name.

11. The method of claim 9, wherein the identification code is linked to a person's name and at least one of the following additional information: job title, job description, biographical data, employer, business address, email address and telephone number, and the signal being sent to other conference call equipment represents the person's name and the additional information.

12. The method of claim 9, wherein the signal being sent is the identification code and the receiving conference call equipment accesses from a memory at least a person's name corresponding to the identification code.

13. The method of claim 9, wherein the identification code is a unique ID of the transmitting device and the unique ID is to the identity of the possessor of the transmitting device.

14. The method of claim 9, wherein said receiving step is accomplished via a wireless link.

15. The conference call equipment of claim 8, wherein said interrogator is an RFID interrogator for reading an RFID tag mounted in a fixed position proximate a seating position in the conferencing room.

16. The conference call equipment of claim 8, wherein said interrogator is a bar code scanner for reading a bar code tag mounted in a fixed position proximate a seating position in the conferencing room.

17. The conference call equipment of claim 8, wherein at least one microphone of said microphone array is used to transmit the voices of participants to the conference call.

18. The conference call equipment of claim 8, wherein said microphone array includes a plurality of microphones mounted in or attached to the walls or ceiling of the conferencing room.

19. The conference call equipment of claim 8, wherein said microphone array includes a plurality of microphones mounted in or attached to a unit placed in the conferencing room.

20. The conference call equipment of claim 19, wherein said unit is a decorative housing for placement on a conference table in the conferencing room.

* * * * *